United States Patent
Porter et al.

(10) Patent No.: US 9,663,232 B1
(45) Date of Patent: May 30, 2017

(54) AIRCRAFT SEAT ASSEMBLY HAVING A QUICK CHANGE PRELOADING TRACK LOCK ASSEMBLY

(71) Applicant: AMI Industries, Inc., Colorado Springs, CO (US)

(72) Inventors: Ryan Stuart Porter, Monument, CO (US); Keith M. Ferguson, Colorado Springs, CO (US)

(73) Assignee: AMI INDUSTRIES, INC., Colorado Springs, CO (US)

(*) Notice: Subject to any disclaimer, the term of this patent is extended or adjusted under 35 U.S.C. 154(b) by 0 days.

(21) Appl. No.: 15/130,073

(22) Filed: Apr. 15, 2016

(51) Int. Cl.
*A47B 97/00* (2006.01)
*B64D 11/06* (2006.01)

(52) U.S. Cl.
CPC ............................. *B64D 11/0696* (2013.01)

(58) Field of Classification Search
CPC ............ B64D 11/0696; B60N 2/01516; B60N 2/01525; B60N 2/01541; B60N 2/01558; B60N 2/01566; B60N 2/01575; B60N 2/015; B60N 2/08; B60N 2/0818; B60P 7/0807; B60P 7/0815
USPC ................. 248/500, 503; 410/101, 104–105; 297/344.11
See application file for complete search history.

(56) References Cited

U.S. PATENT DOCUMENTS

| | | | |
|---|---|---|---|
| 4,911,381 A * | 3/1990 | Cannon | B64D 25/04 244/122 R |
| 5,871,318 A | 2/1999 | Dixon et al. | |
| 7,021,596 B2 * | 4/2006 | Lory | B60P 7/0815 248/423 |
| 7,837,145 B2 | 11/2010 | Wodak | |
| 8,292,224 B1 * | 10/2012 | Ahad | B64D 11/0696 244/118.6 |
| 8,474,756 B2 * | 7/2013 | Allain | B64D 11/0696 244/118.6 |
| 2005/0173608 A1 * | 8/2005 | Lory | B60P 7/0815 248/418 |
| 2007/0122254 A1 * | 5/2007 | LaConte | B64D 11/0696 411/551 |
| 2010/0108808 A1 * | 5/2010 | Allain | B64D 11/0696 244/118.6 |
| 2014/0248103 A1 * | 9/2014 | Baldsiefen | B60P 7/0815 410/104 |

FOREIGN PATENT DOCUMENTS

| | | |
|---|---|---|
| EP | 1607329 A1 | 12/2005 |
| GB | 2219493 A | 12/1989 |

* cited by examiner

*Primary Examiner* — Christopher E Garft
(74) *Attorney, Agent, or Firm* — Cantor Colburn LLP

(57) ABSTRACT

An aircraft seat assembly includes a foot assembly, a seat, and a track lock assembly. The foot assembly is received within a track assembly disposed on an aircraft floor. The seat is connected to the foot assembly. The track lock assembly moves between a lock position and an unlock position. The track lock assembly includes a clamping shaft having a base member and a shaft. The base member is received within the track assembly. The shaft extends from the base member and extends through the foot assembly.

17 Claims, 3 Drawing Sheets

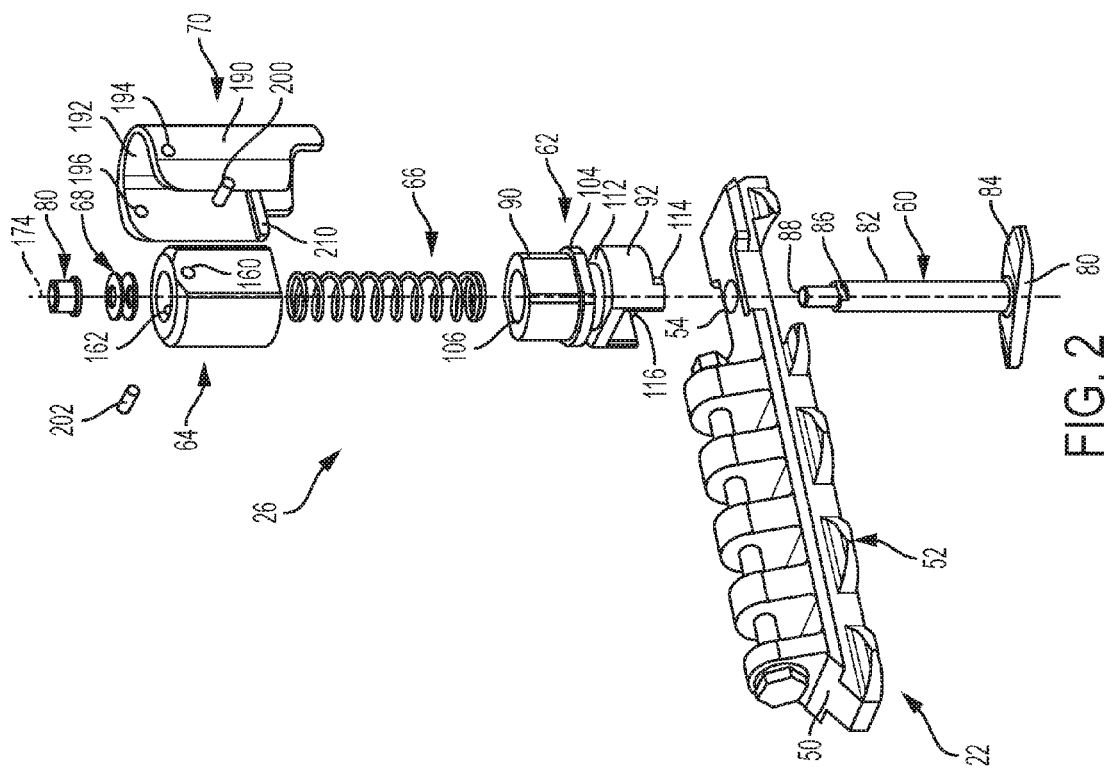
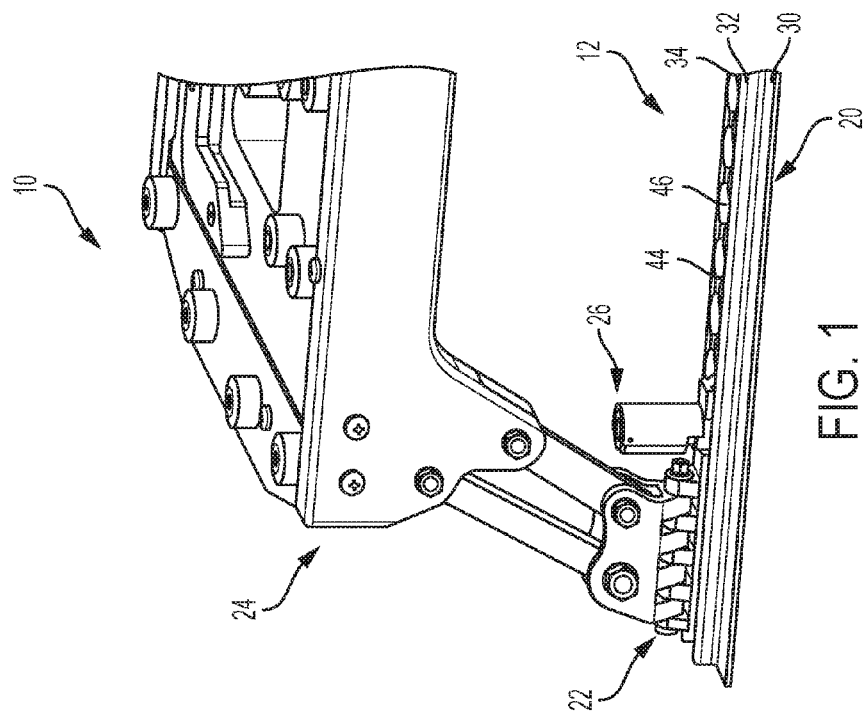
FIG. 1
FIG. 2

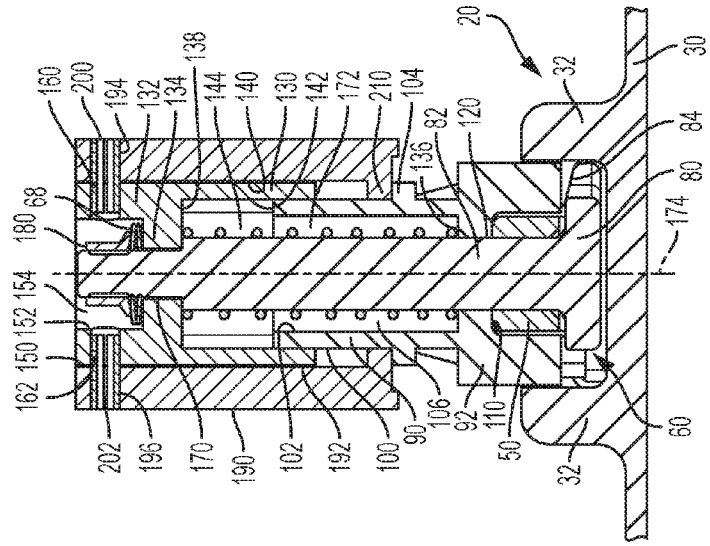
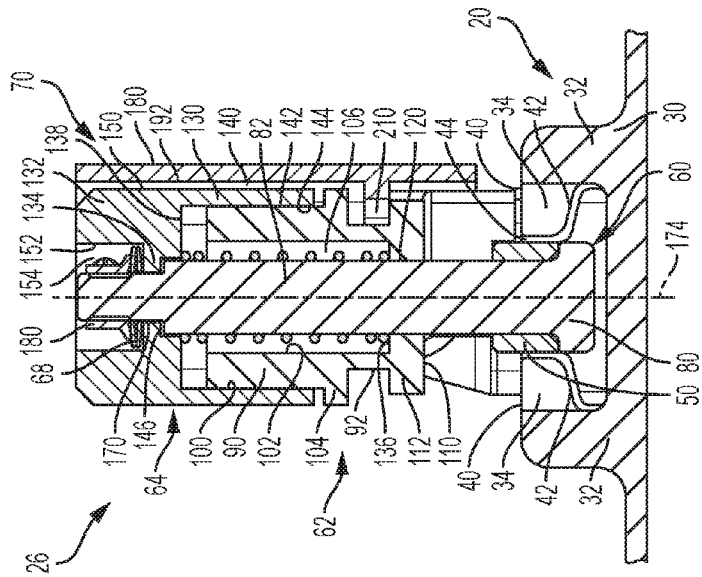
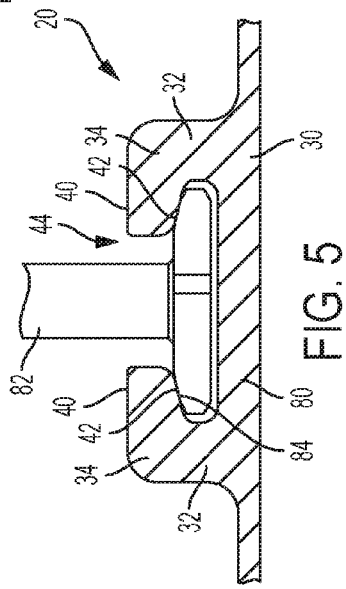
FIG. 3
FIG. 4
FIG. 5

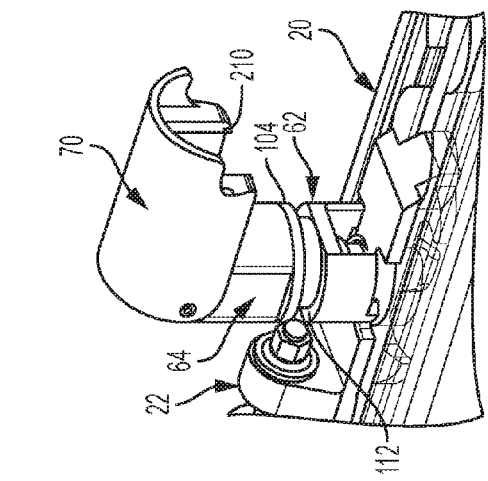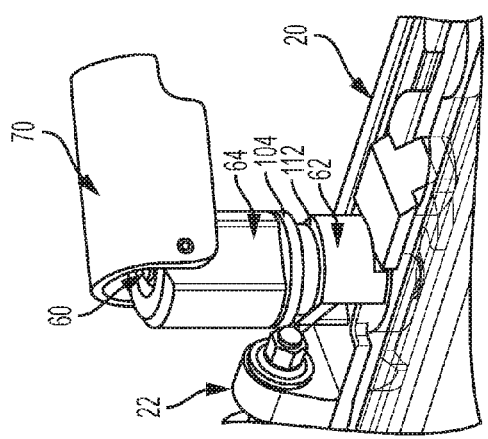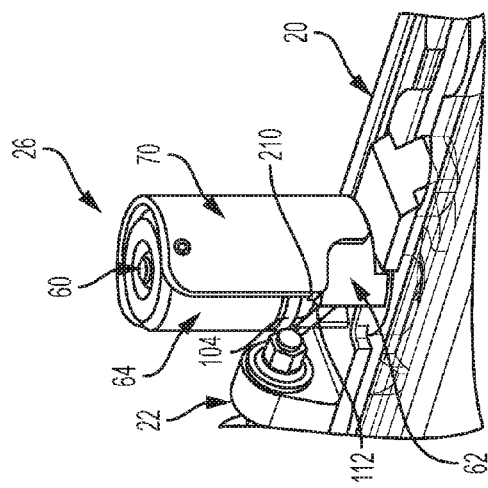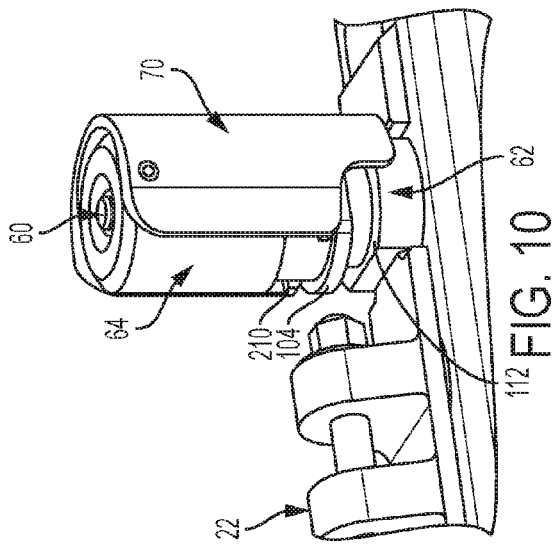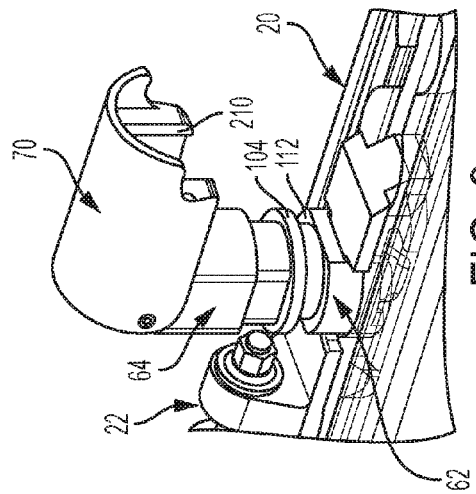

AIRCRAFT SEAT ASSEMBLY HAVING A QUICK CHANGE PRELOADING TRACK LOCK ASSEMBLY

BACKGROUND

The present disclosure relates to an aircraft seat assembly having a quick change preloading track lock assembly.

Aircraft seat assemblies are provided with a mechanism to lock the aircraft seat to inhibit fore and aft motion of the seat within a longitudinal track. The mechanism to lock the aircraft seat generally includes a pin that extends into the longitudinal track. The fit between the pin and a locking feature of the longitudinal track is relatively loose. This loose fit may result in play or movement within the joint formed by the mechanism and the longitudinal track that may be detected by the occupant of the seat.

BRIEF DESCRIPTION

According to an embodiment of the present disclosure, an aircraft seat assembly is provided. The aircraft seat assembly includes a foot assembly, a seat, and a track lock assembly. The foot assembly is received within a track assembly disposed on an aircraft floor. The seat is connected to the foot assembly. The track lock assembly moves between a lock position that inhibits movement of the seat relative to the track assembly and an unlock position that permits movement of the seat relative to the track assembly. The track lock assembly includes a clamping shaft having a base member and a shaft. The base member is received within the track assembly. The shaft extends from the base member and extends through the foot assembly.

According to another embodiment of the present disclosure, a track lock assembly for an aircraft seat is provided. The track lock assembly includes a clamping shaft, a locking collar, and a compression cap. The clamping shaft has a base member and a shaft. The base member is received within a track assembly coupled to an aircraft floor. The shaft extends from the base member and through a foot assembly coupled to the track assembly. The locking collar has a first collar portion having a counter bore and a second collar portion having a bore. The compression cap has a first cap portion defining a first bore, a second cap portion defining a second bore, and the cap shoulder extending between the first cap portion and the second cap portion. The cap shoulder defines an opening. The shaft of the clamping shaft extends through the bore, the counter bore, the first bore, the opening, and the second bore along an axis.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is a partial perspective view of a seat assembly having a track lock assembly;

FIG. 2 is a disassembled view of the track lock assembly;

FIG. 3 is a sectional view of the track lock assembly in an unlock position;

FIG. 4 is a sectional view of the track lock assembly in a lock position;

FIG. 5 is a sectional view of a clamping shaft of the track lock assembly in a lock position; and FIGS. 6-10 are perspective views of the track lock assembly moving from an unlocked and latched position towards a locked and latched position.

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to FIG. 1, a partial perspective view of an aircraft seat assembly 10 is shown. The aircraft seat assembly 10 is connected to an aircraft floor 12. The aircraft seat assembly 10 includes a track assembly 20, a foot assembly 22, a seat 24, and a track lock assembly 26.

Referring to FIGS. 1-5, the track assembly 20 is disposed on the aircraft floor 12. The track assembly 20 is a longitudinally extending track having a base 30, a pair of opposing walls 32, and a pair of lips 34. The base 30 is connected to the aircraft floor 12. The pair of opposing walls 32 extend from the base 30. The pair of opposing walls 32 are spaced apart from each other and are disposed substantially parallel to each other. The pair of lips 34 extend from the ends of the pair of opposing walls 32. The pair of lips 34 extend towards each other. The pair of lips 34 include a first surface 40 that face towards the seat 24 and a second surface 42 disposed opposite the first surface 40. The second surface 42 faces towards the base 30. The second surface 42 is angled relative to the first surface 40.

The base 30, the pair of opposing walls 32, and the pair of lips 34 define a slot 44. The slot 44 extends along a length of the track assembly 20. The pair of lips 34 define a plurality of arcuate access openings 46. The plurality of arcuate access openings 46 extend from an edge of the pair of lips 34 towards the pair of opposing walls 32, respectively. The plurality of arcuate access openings 46 are configured to at least partially receive a portion of the foot assembly 22.

The foot assembly 22 is at least partially received within the track assembly 20. The foot assembly 22 includes a foot body 50 and a plurality of feet 52. The plurality of feet 52 extend away from the foot body 50. The plurality of feet 52 are provided with a shape complementary to the plurality of arcuate access openings 46. The plurality of feet 52 extends through the plurality of arcuate access openings 46. The plurality of feet 52 are received within the slot 44 of the track assembly 20. The foot body 50 defines a foot opening 54 disposed between sets of feet of the plurality of feet 52.

The seat 24 is connected to the foot assembly 22. The seat 24 is secured to the track assembly 20 by the foot assembly 22. The track lock assembly 26 interfaces with the track assembly 20 and the foot assembly 22 to clamp the foot assembly 22 into the track assembly 20. The track lock assembly 26 provides an over center latching feature that provides a secure detent feel when the track lock assembly 26 is properly locked onto the foot assembly 22.

The track lock assembly 26 may be preassembled to the foot assembly 22 prior to installation of the seat 24 of the aircraft seat assembly 10 into the track assembly 20. The track lock assembly 26 is movable between a lock position and an unlock position. The lock position inhibits movement of the seat 24 and/or the foot assembly 22 relative to the track assembly 20. The unlock position permits movement of the seat 24 and/or the foot assembly 22 relative to the track assembly 20. The track lock assembly 26 includes a clamping shaft 60, a locking collar 62, a compression cap 64, a biasing member 66, a compression washer 68, and a latching lever 70.

The clamping shaft 60 is rotatable between the lock position and the unlock position. The clamping shaft 60 includes a base member 80 and a shaft 82. The base member 80 is received within the slot 44 of the track assembly 20. The base member 80 includes a chamfered surface 84. The chamfered surface 84 of the base member 80 is configured to engage the second surface 42 of the pair of lips 34 while the clamping shaft 60 of the track lock assembly 26 is in the lock position. The chamfered surface 84 of the base member 80 is configured to not engage the second surface 42 of the pair of lips 34 while the clamping shaft 60 of the track lock assembly 26 is in the unlock position.

The shaft 82 extends from the base member 80 towards the seat 24. The shaft 82 extends through the foot opening 54 of the foot assembly 22, the locking collar 62, and at least partially through the compression cap 64. The shaft 82 includes a pair flats 86 spaced apart from the base member 80. The pair of flats 86 are disposed proximate an end portion 88 of the shaft 82. The end portion 88 of shaft 82 may have a diameter or width less than a diameter or width of the remainder of the shaft 82.

The locking collar 62 is disposed on the foot assembly 22. The locking collar 62 at least partially straddles the foot body 50 of the foot assembly 22. The locking collar 62 includes a first collar portion 90 and a second collar portion 92. The first collar portion 90 is spaced apart from and does not engage the foot assembly 22. The first collar portion 90 has an exterior collar surface 100 disposed opposite an interior collar surface 102. The exterior collar surface 100 defines a rib 104 extending about the first collar portion 90. The interior collar surface 102 defines a counter bore 106.

The second collar portion 92 is joined to the first collar portion 90. The second collar portion 92 is configured to engage the foot assembly 22. The second collar portion 92 includes a collar shoulder 110, a rim 112, a first stop tab 114, and a second stop tab 116. The collar shoulder 110 is disposed proximate the foot assembly 22. The collar shoulder 110 is configured to be spaced apart from the surface of the foot body 50 of the foot assembly 22 when the track lock assembly 26 is in the unlock position, as shown in FIG. 3. The collar shoulder 110 is configured to engage a surface of the foot body 50 of the foot assembly 22 when the track lock assembly 26 is in the lock position, as shown in FIG. 4. The collar shoulder 110 includes a floor 136 that faces towards the first collar portion 90.

The collar shoulder 110 of the second collar portion 92 defines a bore 120. The bore 120 is disposed concentric or co-linear with the counter bore 106 of the first collar portion 90. The shaft 82 of the clamping shaft 60 extends through the counter bore 106 of the first collar portion 90 and the bore 120 of the second collar portion 92.

The second collar portion 92 defines a rim 112 that extends about an exterior surface of the second collar portion 92. The rim 112 is spaced apart from the rib 104.

The first stop tab 114 and the second stop tab 116 are disposed opposite each other. The first stop tab 114 and the second stop tab 116 extend away from the second collar portion 92 and define a saddle shaped region. The first stop tab 114 and the second stop tab 116 extend towards the track assembly 20. The first stop tab 114 and the second stop tab 116 are disposed on opposite sides of the foot body 50 of the foot assembly 22 such that the saddle shaped region straddles the foot body 50 of the foot assembly 22.

The compression cap 64 is spaced apart from the track assembly 20 and the foot assembly 22. The compression cap 64 is disposed on the locking collar 62. The compression cap 64 includes a first cap portion 130, a second cap portion 132, and a cap shoulder 134.

The first cap portion 130 includes a first exterior cap surface 140 and a first interior cap surface 142. The first interior cap surface 142 is disposed opposite the first exterior cap surface 140. The first interior cap surface 142 of the first cap portion 130 defines a first bore 144. The first collar portion 90 is at least partially received within the first bore 144 of the first cap portion 130; such that the exterior collar surface 100 of the first collar portion 90 slidably engages the first interior cap surface 142 of the first cap portion 130. The first cap portion 130 defines an elongated recess 146 that extends from an internal surface of the compression cap 138 towards the second cap portion 132. The elongated recess 146 engages the pair of flats 86 of the shaft 82 of the clamping shaft 60 to clock the compression cap 64 to the clamping shaft 60.

The second cap portion 132 includes a second exterior cap surface 150 and a second interior cap surface 152. The second interior cap surface 152 is disposed opposite the second exterior cap surface 150. The second interior cap surface 152 of the second cap portion 132 defines a second bore 154.

The second cap portion 132 defines a first opening 160 and the second opening 162. The first opening 160 extends from the second exterior cap surface 150 to the second interior cap surface 152. The second opening 162 is radially spaced apart from the first opening 160. The second opening 162 extends from the second exterior cap surface 150 to the second interior cap surface 152.

The cap shoulder 134 extends between the first cap portion 130 and the second cap portion 132, such that the cap shoulder 134 is disposed between the first cap portion 130 and the second cap portion 132. The cap shoulder 134 defines a cap shoulder opening 170. The cap shoulder opening 170 is disposed concentric or co-linear with the first bore 144 of the first cap portion 130 and the second bore 154 of the second cap portion 132.

The first bore 144 of the first cap portion 130, the cap shoulder 134, the counter bore 106 of the first collar portion 90, and the collar shoulder of the second collar portion 92 define a cavity 172. The shaft 82 of the clamping shaft 60 extends through the bore 120, the counter bore 106, the first bore 144, and the second bore 154 along a common axis 174.

The biasing member 66 is disposed between the locking collar 62 and the compression cap 64. The biasing member 66 is disposed within the cavity 172. The biasing member 66 engages the floor 136 of the collar shoulder 110 of the locking collar 62 and the internal surface 138 of the compression cap 64. The biasing member 66 biases the base member 80 of the clamping shaft 60 towards engagement with the pair of lips 34 of the track assembly 20.

The compression washer 68 is received within the second bore 154 of the second cap portion 132. The compression washer 68 is a high force, short stroke biasing member. In at least one embodiment, two compression washers are provided. The compression washer 68 is disposed about an end of the shaft 82 of the clamping shaft 60 that extends at least partially through the second cap portion 132. The compression washer 68 is disposed between a nut 180 and a surface of the cap shoulder 134 that extends between the first cap portion 130 and the second cap portion 132.

The compression washer 68 applies a clamping load between the base member 80 of the clamping shaft 60 and the second surface 42 of the pair of lips 34 of the track assembly 20. The compression washer 68 attempts to pull the shaft 82 of the clamping shaft 60 past the pair of lips 34 of the track assembly 20 to increase the clamping load or preload as the nut 180 is tightened. The compression washer 68 generates an over center force when the latching lever 70 is in the latched position and the clamping shaft 60 of the track lock assembly 26 is in the lock position or the unlock position. The compressibility of the compression washer 68 generates the over center latching loads.

The latching lever 70 is connected to the compression cap 64. The latching lever 70 is movable between a latched position and an unlatched position. The latching lever 70 includes an exterior latching lever surface 190 and an interior latching lever surface 192 disposed opposite the exterior latching lever surface 190. The interior latching lever surface 192 is disposed proximate the second exterior cap surface 150 of the second cap portion 132 of the compression cap 64 when the latching lever 70 is in the latched position.

The latching lever 70 further includes a first latching lever opening 194 and a second latching lever opening 196. The first latching lever opening 194 extends from the exterior latching lever surface 190 to the interior latching lever surface 192. The first latching lever opening 194 is disposed coaxial with the first opening 160 of the second cap portion 132.

The second latching lever opening 196 extends from the exterior latching lever surface 190 to the interior latching lever surface 192. The second latching lever opening 196 is disposed coaxial with the second opening 162 of the second cap portion 132.

A first pin 200 extends through the first latching lever opening 194 and the first opening 160 of the second cap portion 132. A second pin 202 extends through the second latching lever opening 196 and the second opening 162 of the second cap portion 132. The first pin 200 and the second pin 202 pivotally connect the latching lever 70 to the second cap portion 132 of the compression cap 64.

The interior latching lever surface 192 defines a ledge 210. The ledge 210 extends about the interior latching lever surface 192. The ledge 210 of the latching lever 70 engages a surface of the rib 104 of the locking collar 62 when the clamping shaft 60 is in the lock position and the latching lever 70 is in the latched position, as shown in FIG. 4. The ledge 210 of the latching lever 70 engages a surface of the rim 112 of the second collar portion 92 of the locking collar 62 when the clamping shaft 60 is in the unlock position and the latching lever 70 is in the latched position, as shown in FIG. 3.

Referring to FIG. 6-FIG. 10, the process of moving the track lock assembly 26 from the unlock position and the latched position towards the lock position and the latched position is shown. The clamping shaft 60, the locking collar 62, and the compression cap 64 are clocked together such that the clamping shaft 60, the locking collar 62 and the compression cap 64 rotate in unison in response to rotation of the latching lever 70 about the common axis 174. The clamping shaft 60 and the locking collar 62 are permitted to move axially and independently at the same time with respect to the compression cap 64 and the latching lever 70. The latching lever 70 is configured to pivot the compression cap 64 and the locking collar 62 to move the clamping shaft 60 between the lock position and the unlock position.

As shown in FIG. 6, the latching lever 70 is in the latched position while the clamping shaft 60 of the track lock assembly 26 is in the unlock position. The base member 80 of the clamping shaft 60 of the track lock assembly 26 does not engage the second surface 42 of the pair of lips 34 of the track assembly 20, while the track lock assembly 26 is in the unlock position.

As shown in FIG. 7, the latching lever 70 is pivoted about an axis that extends through the first pin 200 and the second pin 202. The pivoting of the latching lever 70 pivots the latching lever 70 from the latched position towards the unlatched position.

As shown in FIG. 8, the latching lever 70 while in the unlatched position, is used to rotate the locking collar 62 and the compression cap 64 to rotate the clamping shaft 60 from the unlock position towards the lock position. At least one of the first stop tab 114 and the second stop tab 116 engage a side of the foot body 50 of the foot assembly 22 to inhibit or stop rotation of the locking collar 62 and the compression cap 64 of the track lock assembly 26.

As shown in FIG. 9, the clamping shaft 60 has achieved the lock position. While in the lock position the saddle shaped region defined by the first stop tab 114 and the second stop tab 116 of the second collar portion 92 is free to drop down over the foot body 50 of the foot assembly 22. In the lock position, the biasing member 66 pushes the locking collar 62 towards the foot assembly 22 and into at least one of the plurality of arcuate access openings 46. The locking collar 62 "snaps down" such that the compression cap 64 is spaced apart from the rib 104 of the locking collar 62 to provide an indication to a person installing the seat assembly 10 that the track lock assembly 26 has achieved the lock position. The locking collar 62 is at least partially received within at least one of the plurality of arcuate openings 46, thus preventing fore/aft motion of the foot assembly 22 within the track assembly 20.

As shown in FIG. 10, the latching lever 70 is rotated from the unlatched position to the latched position. The clamping shaft 60 of the track lock assembly 26 is in the lock position and the latching lever is in the latched position to secure the foot assembly 22 to the track assembly 20, eliminating annoying play that may be detected by the occupant. A process to unlock the track lock assembly 26 may be performed by performing the above outlined steps in reverse. The pivoting of the latching lever 70 from the latched position towards the unlatched position enables a person to lift the locking collar 62 against the biasing member 66 until the saddle region clears the foot body 50 of the foot assembly 22. This enables the track lock assembly 26 to be pivoted from the lock position towards the unlock position.

Throughout this specification, the term "attach," "attachment," "connected," "coupled," "coupling," "joined," "mount," or "mounting" shall be interpreted to mean that a structural component or element is in some manner connected to or contacts another element, either directly or indirectly through at least one intervening structural element, or is integrally formed with the other structural element.

Throughout this specification, the term "bore" shall be interpreted to mean an opening that may take various shapes. Such various shapes may include a circular opening, an ovate opening, an opening with rounds and two symmetric flats, a rectangular opening, or the like.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An aircraft seat assembly, comprising:
    a foot assembly received within a track assembly disposed on an aircraft floor;
    a seat connected to the foot assembly; and
    a track lock assembly movable between a lock position that inhibits movement of the seat relative to the track assembly and an unlock position that permits movement of the seat relative to the track assembly, including:
        a clamping shaft having a base member that is received within the track assembly and a shaft that extends from the base member and through the foot assembly,
        a locking collar having a first collar portion and a second collar portion, the first collar portion having a counter bore and the second collar portion having a bore disposed concentric to the counter bore, wherein the shaft of the clamping shaft extends through the counter bore and the bore, and
        a compression cap having a first cap portion defining a first bore and a second cap portion defining a second bore and a cap shoulder disposed between the first cap portion and the second cap portion.

2. The aircraft seat assembly of claim 1, wherein the track assembly includes a base disposed on the aircraft floor, a pair of opposing walls extending from the base, and a pair of lips extending from each wall of the pair of opposing walls towards each other.

3. The aircraft seat assembly of claim 2, wherein the base member is configured to engage the lip of the track assembly while the track lock assembly is in the lock position.

4. The aircraft seat assembly of claim 1, wherein the second collar portion includes a first stop tab and a second stop tab extending towards the track assembly, the first stop tab and the second stop tab disposed on opposite sides of the foot assembly.

5. The aircraft seat assembly of claim 1, wherein the first collar portion is at least partially received within the first bore of the first cap portion.

6. The aircraft seat assembly of claim 5, wherein the first bore of the first cap portion and the counter bore of the locking collar define a cavity.

7. The aircraft seat assembly of claim 6, wherein the track lock assembly further includes:
    a biasing member disposed within the cavity and engages an internal surface of the compression cap and a floor of the locking collar.

8. A track lock assembly, comprising:
    a clamping shaft having a base member that is received within a track assembly coupled to an aircraft floor and a shaft that extends from the base member and through a foot assembly coupled to the track assembly;
    a locking collar having a first collar portion having a counter bore and a second collar portion having a bore;
    a compression cap having a first cap portion defining a first bore, a second cap portion defining a second bore, and a cap shoulder extending between the first cap portion and the second cap portion, the cap shoulder defining an opening, wherein the shaft of the clamping shaft extends through the bore, the counter bore, the first bore, the opening, and the second bore along an axis; and
    a biasing member disposed between the compression cap and the locking collar, wherein the biasing member engages an internal surface of the compression cap and a floor of the locking collar.

9. The track lock assembly of claim 8, wherein the first collar portion defines a rib extending about the first collar portion.

10. The track lock assembly of claim 9, further comprising:
    a latching lever connected to the compression cap, the latching lever defines a ledge extending about an interior surface of the latching lever.

11. The track lock assembly of claim 10, wherein the clamping shaft, the locking collar, and compression cap are rotationally clocked together while permitting axial motion between the clamping shaft, the locking collar, and the compression cap.

12. The track lock assembly of claim 10, wherein the latching lever, the compression cap, and the locking collar rotationally move the clamping shaft between a lock position and an unlock position, wherein the base member of the clamping shaft engages a lip of the track assembly when in the lock position and the base member of the clamping shaft does not engage the lip of the track assembly when in the unlock position.

13. The track lock assembly of claim 12, further comprising:
    at least one compression washer disposed about an end of the shaft of the clamping shaft that is received within the second bore, the compression washer disposed between a nut and a surface of the second cap portion.

14. The track lock assembly of claim 13, wherein the latching lever is movable between a latched position and an unlatched position.

15. The track lock assembly of claim 14, wherein a clamping load between the base member of the clamping shaft and the lip of the track assembly is applied by the compression washer when the clamping shaft is in the lock position and the latching lever is in the latched position.

16. The track lock assembly of claim 15, wherein the ledge engages a surface of the rib when the clamping shaft is in the unlock position and the latching lever is in the latched position.

17. The track lock assembly of claim 15, wherein the ledge engages a surface of the second collar portion when the clamping shaft is in the lock position and the latching lever is in the latched position.

* * * * *